Sept. 24, 1968    N. F. ELICH    3,402,804
CAN LOADER

Filed Jan. 23, 1967    2 Sheets-Sheet 1

INVENTOR.
NICK F. ELICH

BY Fulwider, Patton, Rieber,
Lee and Utecht
ATTORNEYS

Sept. 24, 1968   N. F. ELICH   3,402,804
CAN LOADER
Filed Jan. 23, 1967   2 Sheets-Sheet 2
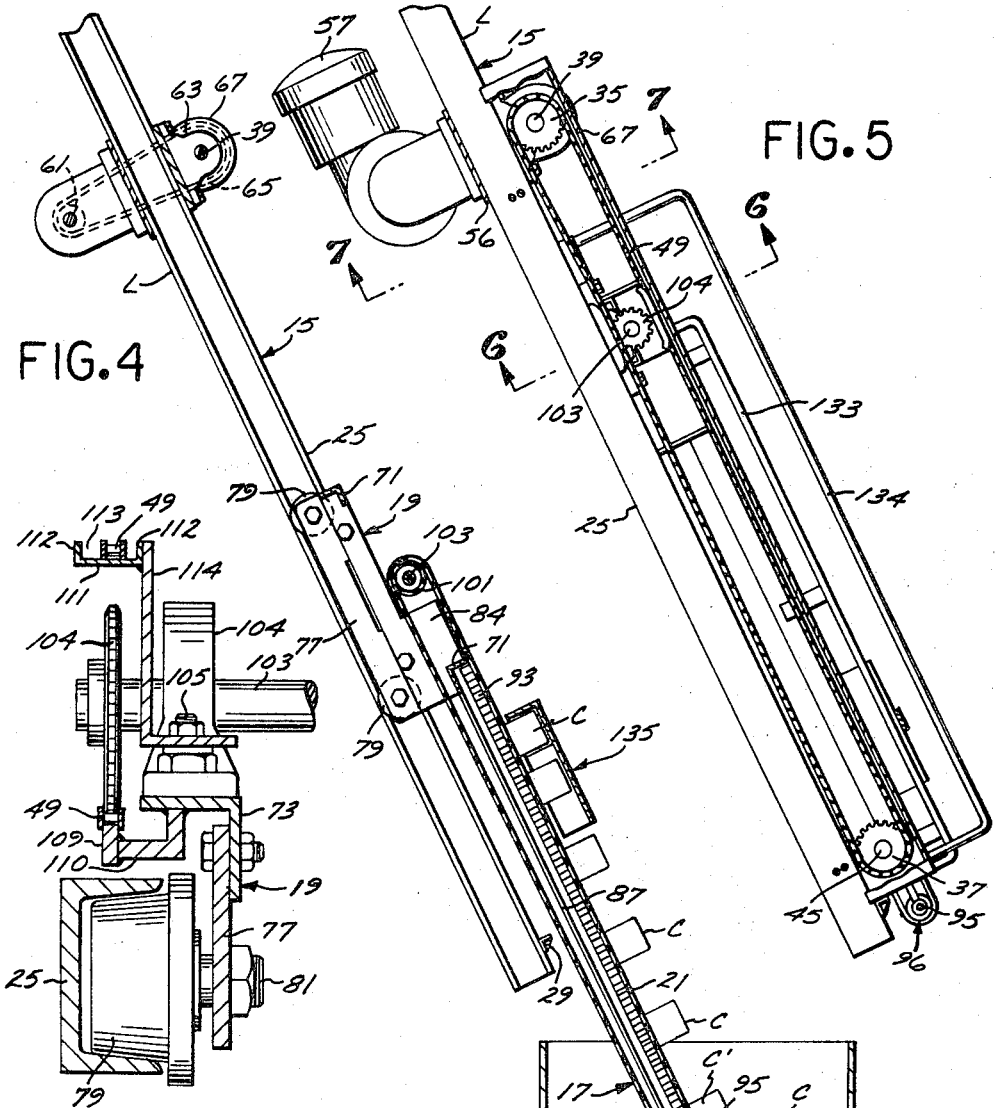
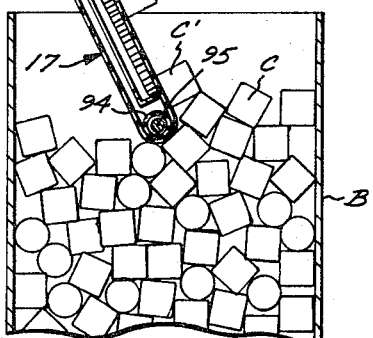
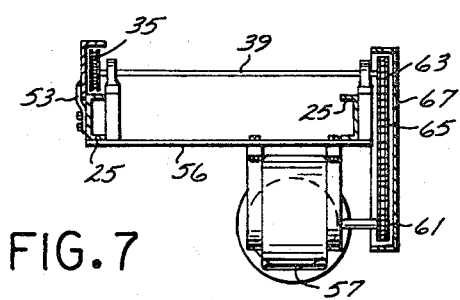
INVENTOR.
NICK F. ELICH
BY Fulwider, Patton, Rieber,
Lee and Utecht
ATTORNEYS United States Patent Office 3,402,804
Patented Sept. 24, 1968

3,402,804
CAN LOADER
Nick F. Elich, San Pedro, Calif., assignor to Star-Kist Foods, Inc., Terminal Island, Calif., a corporation of California
Filed Jan. 23, 1967, Ser. No. 610,945
4 Claims. (Cl. 198—41)

ABSTRACT OF THE DISCLOSURE

A can loader including a conveyor belt mechanism depending rollably from a downward and forwardly inclined main frame and having a magnet supported under the conveyor belt. A driven pinion on the upper shaft of the conveyor belt mechanism that engages the upwardly-moving length of an endless drive chain carried on a pair of sprockets supported from the main frame, one of the sprockets being driven by a motor. The cans are received on the upper portion of the conveyor belt and are maintained frictionally against the downwardly-moving face of the belt by the magnet and move therewith. When deposited cans collect at the lower end of the conveyor and interfere with those moving down the face of the belt, movement of the belt will be resisted and the upwardly-moving length of chain engaged with the pinion will roll the conveyor up the main frame sufficiently to alleviate such interference.

Background of the invention (1) *Field of the invention.*—The present invention relates generally to article conveyors and more particularly to a loader for tin cans and the like.

(2) *Description of the prior art.*—Existing can loaders utilize a magnet supported under the downwardly-moving length of a conveyor belt to attract the cans to the face of the belt and maintain them frictionally thereagainst and moving therewith but retraction of the conveyor from the depositing area is accomplished by employing complex sensing devices that actuate hydraulic retracting means.

Summary of the invention

A main object of the present invention is to provide a loader for filling a container with cans, which loader progressively retracts from such container in response to progressive accumulation of cans being deposited therein.

Another object of the present invention is to provide a can loader of the aforedescribed nature that includes a conveyor which is inclined downwardly to a deposit area within the container and which conveys the cans thereto at a predetermined rate of speed and which also retracts progressively upwardly in response to progressive accumulation of deposited cans.

Another object is to provide a can loader of the aforedescribed nature that includes means for orienting the cans with one of the flat ends thereof against the upper surface of the conveyor belt.

It is a more particular object of this invention to provide a can loader that includes a conveyor belt mechanism depending movably from a main frame and having a magnet supported under the conveyor belt. The conveyor belt mechanism includes a pinion on one of the conveyor belt roller shafts that engages a length of an endless chain that is mounted on a pair of sprockets supported from the main frame. Means are included for driving one of the sprockets to move the length of chain rearward of the direction of conveyance thereby rotating the pinion to drive the conveyor belt. When the cans are moving freely on the conveyor belt the chain will rotate the pinion without affecting the position of the conveyor belt relative to the can container. When a number of cans sufficient to interfere with movement of cans on the belt overlying the magnet has been collected in the depositing area, resistance to belt movement will be increased, consequently increasing pinion-turning resistance and the drive chain will pull the conveyor belt back on the main frame a distance sufficient to allow the cans on the belt to move off the depositing end of such belt.

Brief description of the drawings

FIGURE 4 is a longitudinal sectional view of said loader taken along the lines 4—4 of FIGURE 1;

FIGURE 5 is a left side view of the loader shown in FIGURE 1 and taken partially in section;

FIGURE 6 is a partial transverse sectional view in enlarged scale of the loader shown in FIGURE 1 taken along the line 6—6 of FIGURE 5; and FIGURE 7 is a transverse sectional view of the loader shown in FIGURE 1 taken along the line 7—7 of FIGURE 5.

Description of the preferred embodiment

Figure 1:
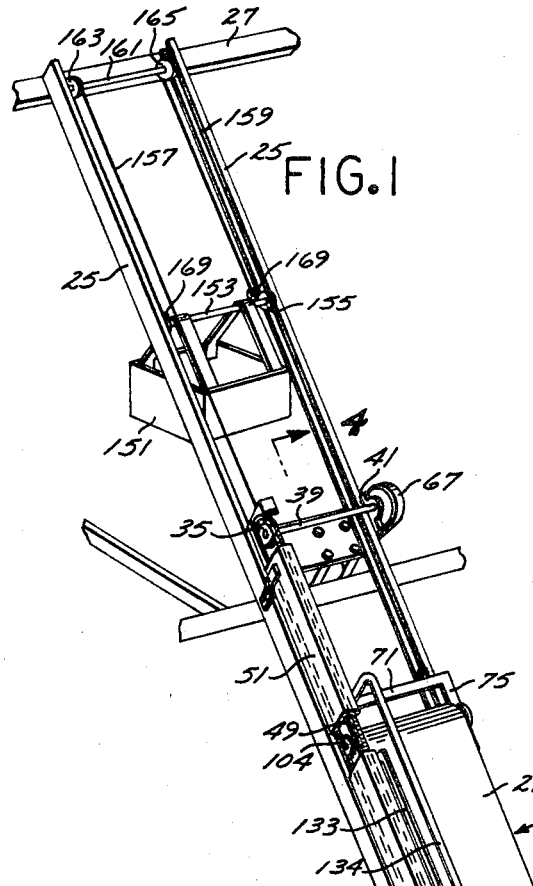
FIGURE 1 is a broken perspective view of a preferred form of can loader embodying the present invention.

Referring to the drawing and particularly FIGURE 1 thereof, a preferred form of can loader L embodying the present invention is adapted to receive cans C from a downwardly and sidewardly inclined slide S and deposit such cans C within a retort basket B. The cans C travel downwardly through the slide S under the influence of gravity. The can loader L broadly comprises a downwardly and forwardly inclined main frame, generally designated 15, and a conveyor, generally designated 17, which is supported for longitudinal movement relative to the frame 15. The conveyor 17 includes a carriage, generally designated 19, that supports an endless conveyor belt 21. The lower end of the conveyor belt 21 is initially disposed within the lower portion of the retort basket B and the belt is caused to undergo movement whereby its upper run effects downward and forward movement of the cans C into the bottom of the retort basket B. It is a special feature of the present invention that as the deposited cans C build up within the confines of the retort basket B the conveyor 17 will automatically progressively move upwardly upon the frame 15.

More particularly, the frame 17 includes a pair of transversely spaced inwardly-opening longitudinal C-channels 25 that are secured to a fixed structural beam 27 on their upper end and fastened together on their lower end by an angle 29. A pair of sprockets 35 and 37 are aligned on the left-hand side of the frame 15, as viewed in FIGURES 1–5. The upper sprocket 35 is fixedly carried on the left end of a horizontal shaft 39 that is rotatably supported in a pair of pillow blocks 41 that are bolted to mounting plates 43 welded to the sides of the channels 25. The lower driven sprocket 37 is roller bearing mounted on a bolt 45 that is carried by a bracket 47 bolted to the lower end of the left-hand channel 25. An endless chain 49 is trained over the sprockets 35 and 37. A chain guard 51 overfits the chain 49 and is supported on its lower end by the bolt 45 and bracket 47, and on its upper end by a bracket 53 that is affixed to the left-hand channel 25. A motor mount 56 is welded to the underside of the channels 25 intermediate their ends and an electric motor 57 is supported thereunder by nut and bolt assemblies 59. Referring to FIGURE 7, the motor 57 includes a drive pinion 61 that is aligned under a sprocket 63 fixedly supported on the right-hand end of the shaft 39 opposite sprocket 35. An endless drive chain 65 is trained over the pinion 61 and sprocket 63 and is covered by a chain guard 67.

Figure 2:
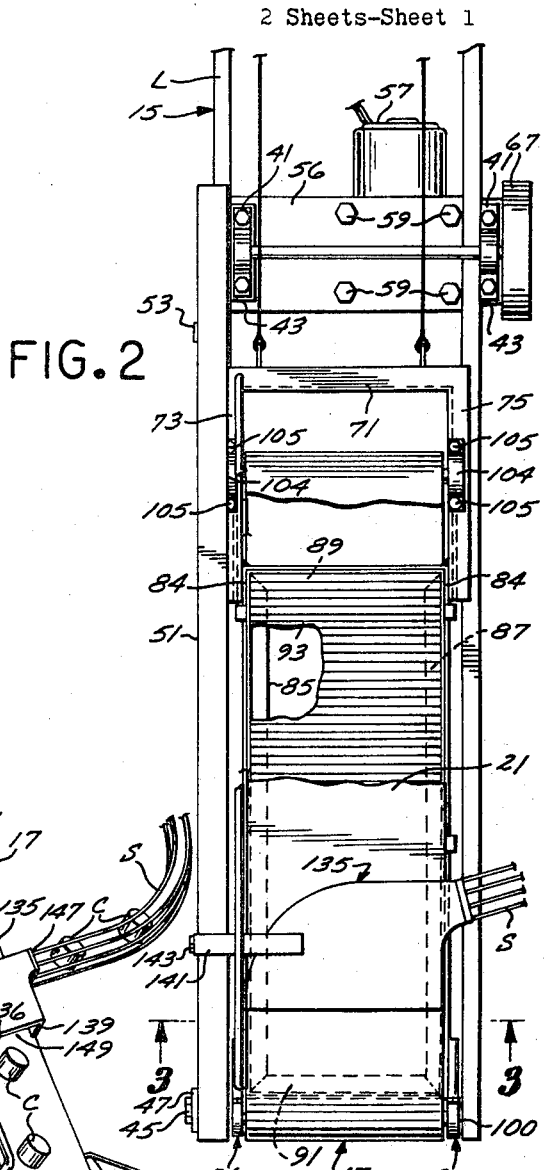
FIGURE 2 is a broken front view of said can loader.

Referring to FIGURES 2, 4, and 6, the carriage 19 includes an end angle 71 on its upper end and a pair of side angles 73 and 75 are welded to opposite ends thereof. The side angles 73 and 75 are bolted to and supported from wheel mounting plates 77. The mounting plates 77 are supported on wheels 79 that are bolted thereto by nut and bolt assemblies 81. Spacers 83 are interposed between the wheels 79 and plates 77 as shown in FIGURE 6. The wheels 79 complementarily interfit the inwardly-opening channels 25 and are rollable thereon to provide longitudinal movement of carriage 19 relative to the frame 17. A pair of side plates 84 are welded to and extend above the side angles 73 and 75 for supporting a pair of longitudinal angles 85 and 87 that extend downwardly and forwardly therefrom. End angles 89 and 91 are welded between the upper and lower ends, respectively, of the longitudinal angles 85 and 87, and cooperate therewith to form a rectangular frame for supporting a generally rectangular magnet 93. A belt support roller 94 is supported at the lower end of the carriage 19 and is mounted rollably on a shaft 95 by means of bushings (not shown). The shaft 95 is supported on its ends by a pair of couplings, generally designated 96, that are welded to the longitudinal angles 85 and 87. The couplings 96 include a tube 97 into which one end of a longitudinally slideable threaded rod 98 extends. A nut 99 is screwed on the rod 98 and abuts the end of the tube 97. The extending ends of the rods 98 carry collars 100 and these collars include aligned bores for accepting opposite ends of the shaft 95. Set screws (not shown) extend through threaded radial bores formed in the collars 100 and are screwed abuttingly against the shaft 95 to secure it in position.

Referring to FIGURES 2 and 4, a belt roller 101 is mounted fixedly and coaxially on a shaft 103 that is journalled in a pair of pillow boxes 104, which pillow boxes are bolted to the side angles 73 and 75 by nut and bolt assemblies 105. A driven pinion 104 is fixedly mounted on the extending left-hand end of the shaft 103 for engaging the upwardly-moving run of the chain 49.

Referring particularly to FIGURES 5 and 6, a chain slide 109 is supported from one leg of an angle 110, the other leg of which is welded to the side angle 73. The slide 109 is flared down from its top surface on both ends to accommodate passage of the chain 49 thereover and is supported to maintain the chain in engagement with the pinion 104. A chain guide 111 is formed with vertical lips 112 spaced at opposite sides of a chain path 113 for accepting the chain 49. The guide 111 extends sidewardly from the vertical leg of a short angle 114, the other leg of which angle includes a bore for accepting the nut and bolt assembly 105 that secures the left pillow block 104 in place. Thus, the upper length of chain 49 trains through the path 113 and is supported for engagement with drive pinion 61.

A can guide 133 extends along the left side of the belt 21 and is welded to the side angle 85. A handle 134 for manually positioning the conveyor 17 also extends along the left side of the conveyor and is likewise welded to the angle 85.

Figure 3:
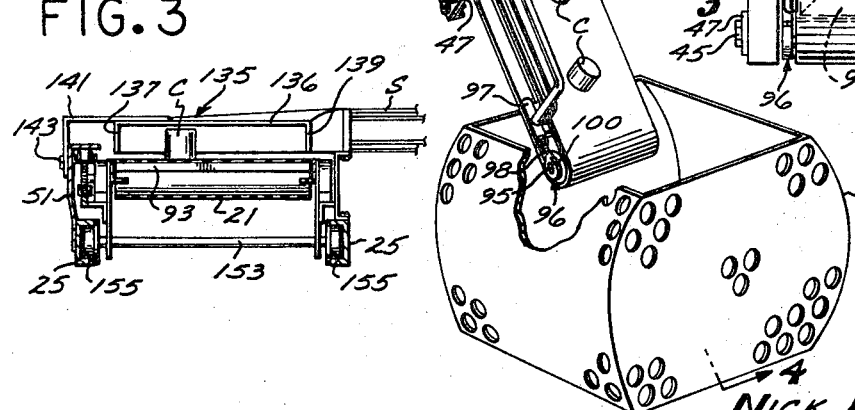
FIGURE 3 is a sectional view taken on line 3—3 of FIGURE 2.

Referring now to FIGURES 1 and 3, an open bottom can chute, generally designated 135 and including a top wall 136 and side walls 137 and 139 is supported over the belt 21 by an L-shaped mounting bracket 141. The bracket 141 is bolted to the chain guard 51 by a nut and bolt assembly 143 and the chute is welded thereto. As shown in FIGURE 3, the top wall 136 is spaced above the conveyor belt surface a distance slightly in excess of the height of a can C. Thus, the cans C are received from the slide S through the side opening inlet 147 and are maintained upright on the belt 21 throughout their travel into and out of the chute 135.

The conveyor 17 is partially counterweighted upwardly by a counterweight 151 that depends from a transverse rod 153. Rod 153 has mounting wheels 155 on its opposite ends that ride within the inwardly opening sides of channels 25. Rod 153 is connected with the conveyor 17 by means of a pair of cables 157 and 159, such cables passing over a pair of pulleys 163 and 165 keyed to a rod 161 rotatably supported between the upper ends of channels 25. The cables 157 and 159 are each fastened on one end to an eye bolt 167 screwed into a tapped bore in the angle 71 and on the opposite end to an eye bolt 169 screwed into a tapped bore in the shaft 153 with their intermediate portions being threaded over the pulleys 163 and 165, respectively. Thus, when the conveyor 17 moves upwardly and downwardly on the main frame 15 the counterweight 151 will concurrently move downwardly and upwardly.

In operation, the motor 57 is started and the conveyor 17 manually moved down until the lower end of the conveyor extends to the bottom of the basket B to be filled. Cans C are then fed down the curved slide S and onto the downwardly moving face of the belt 21. Such cans will be attracted by the magnet 93 thus causing them to move downwardly at the same speed as the conveyor belt 21. During their passage through the chute 135 the cans C will be maintained in an upright position thus assuring that a flat end abuts the belt 21. Since the cans C are ejected onto the left side of the conveyor 17 as viewed in FIGURE 1, with significant velocity, some will skid across the belt surface, but will be stopped from skidding off the conveyor belt by the can guide 133. When the cans C on the conveyor belt have been moved below the lower end of the magnet 93, they will no longer be magnetically attracted against the belt 21 surface and will fall the remaining short distance into the bottom of the basket B. Cans C will continue to be deposited in the bottom of the basket B in this manner until they pile up at the lower end of the conveyor belt sufficiently to interfere with the additional cans being moved down the conveyor belt 21. Referring now to FIGURE 4, upon such occurrence, the can C' stopped at the lower end of the belt 21 will in effect yieldingly lock the belt against continued movement relative to the magnet 93 and hence to the carriage 17. This action will tend to restrain the upper shaft 103 and its driven pinion 104 from rotation. The endless chain 49 will continue its movement, however, and accordingly its lower run will tend to lift the driven pinion 104 relative to the frame 15. Such lifting movement is directly transferred to the conveyor 17. In this manner the lower end of the conveyor will be lifted sufficiently within basket B to permit can C' to fall off the lower end of belt 21. Clearing of the can C' from the belt 21 permits a return to normal of the operation of the conveyor 17 whereby it will remain at its raised position until the pile of cans in basket B again interferes with movement of cans off the belt 21. The conveyor lifting operation will then be automatically repeated.

From the foregoing description it will be clear that the loader of the present invention provides a convenient and economical means for automatically piling metallic articles in a vertical pile without exposing them to danger of being dropped and damaged. The loader is of simple design and is economical to manufacture.

Various modifications and changes may be made with regard to the foregoing detailed description without departing from the spirit of the invention or the scope of the following claims.

I claim:

1. A loader for receiving cans or the like and depositing them within a container, said loader comprising:
   a downwardly inclined elongated frame;
   a carriage longitudinally slidably carried by said frame for movement toward and away from said container;
   a conveyor belt supported on said carriage;

a magnet on said carriage below the upper run of said belt;
a motor on said frame;
an upper drive sprocket on said frame above said carriage and driven by said motor;
a lower driven sprocket on the lower portion of said frame;
a roller on said carriage that is drivingly engaged with said conveyor belt to move its upper run towards said container;
an endless chain that encircles said upper drive sprocket and said lower driven sprocket;
a driven pinion keyed to said roller and engaging the intermediate portion of said chain to thereby move the upper run of said belt towards said container;
and chute means on said frame that direct cans onto the upper run of said conveyor belt, said cans being attracted to the upper run of said belt by said magnet whereby they tend to move downwardly on said belt at the same speed as said belt and drop into said container until such time as the cans deposited within said container interfere with cans moving down said belt whereupon cans on the lower end of said belt yieldingly lock said belt against continued movement relative to said carriage and said driven pinion climbs along said chain to thereby lift said frame and withdraw the lower end of said belt from its original position relative to said container.

2. A loader as set forth in claim 1 wherein said frame is provided with counterweight means that constantly bias said carriage upwardly relative to said container.

3. A loader as set forth in claim 2 wherein said chute means includes a side opening inlet and a top wall that is parallel to the upper run of said conveyor belt and is spaced above the top run of said belt a distance slightly in excess of the height of said cans whereby said cans are maintained upright as they enter and leave said chute means.

4. A loader as set forth in claim 1 wherein said chute means includes a side opening inlet and a top wall that is parallel to the upper run of said conveyor belt and is spaced above the top run of said belt a distance slightly in excess of the height of said cans whereby said cans are maintained upright as they enter and leave said chute means.

References Cited

UNITED STATES PATENTS 3,010,562   11/1961   Roehrbein   198—41
3,334,725   8/1967   Wardlaw   198—79

RICHARD E. AEGERTER, *Primary Examiner.*